US006313880B1

(12) United States Patent
Smyers et al.

(10) Patent No.: US 6,313,880 B1
(45) Date of Patent: Nov. 6, 2001

(54) DISPLAY WITH ONE OR MORE DISPLAY WINDOWS AND PLACEMENT DEPENDENT CURSOR AND FUNCTION CONTROL

(75) Inventors: Scott Smyers, Los Gatos; Hisato Shima, Saratoga; Chenchu Chilamakuri, Fremont, all of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 08/832,490

(22) Filed: Apr. 3, 1997

(51) Int. Cl.[7] .................................................. H04N 5/445
(52) U.S. Cl. .......................... 348/552; 348/564; 348/563; 348/565; 348/734; 395/200.48; 345/717; 345/718; 345/716
(58) Field of Search ...................... 348/552, 553, 348/564, 565, 563, 569, 734, 12, 10, 13; 395/200.3, 200.48; 345/157, 158, 145, 115; H04N 7/14, 5/445

(56) References Cited

U.S. PATENT DOCUMENTS

| 4,622,013 | * | 11/1986 | Cerchio | 434/118 |
|---|---|---|---|---|
| 5,111,296 | * | 5/1992 | Duffield et al. | 348/565 |
| 5,113,259 | * | 5/1992 | Romesburg et al. | 348/565 |
| 5,367,316 | * | 11/1994 | Ikezaki | 345/158 |
| 5,408,603 | | 4/1995 | Van de Lavoir et al. | 395/161 |
| 5,416,535 | | 5/1995 | Sato et al. | 348/706 |
| 5,420,573 | | 5/1995 | Tanaka et al. | 340/825.24 |
| 5,434,626 | * | 7/1995 | Hayashi et al. | 348/569 |
| 5,436,641 | | 7/1995 | Hoang et al. | 345/197 |
| 5,438,372 | * | 8/1995 | Tsumori et al. | 348/565 |

(List continued on next page.)

FOREIGN PATENT DOCUMENTS 0 577 054 A1   1/1994   (EP) .................. H04N/7/18

OTHER PUBLICATIONS

The IEEE–1394 High Speed Serial Bus, by R.H.J. Bloks, 1996, pp. 209–216.*

IEEE 1394: A Ubiquitous Bus, By Gary Hoffman et al., 1995 pp. 334–338.*

"A Bus on a Diet—The Serial Bus Alternative, An Introduction to the P1394 High Performance Serial Bus," Michael Teener, Feb. 24, 1992, pp. 316–321.

"P1394 Standard for a High Performance Serial Bus," IEEE Standards Department, Jul. 7, 1995, Piscataway, New Jersey.

Primary Examiner—Michael Lee
Assistant Examiner—Jean W. Désir
(74) Attorney, Agent, or Firm—Haverstock & Owens LLP

(57) ABSTRACT

A television with multiple display windows and placement dependent cursor and function control is configured to receive and simultaneously display video and graphics input from multiple devices, including but not limited to personal computers, video cassette recorders, settop boxes, video cameras and video disk players, as well as display video input signals from cable, antenna and satellite sources. The size of each display window is adjustable to encompass a predetermined amount of the display screen of the television. Multiple input windows driven by multiple devices can be viewed simultaneously. One or more cursor control and input devices are used to control the operation of the television and of the devices driving the display windows. The cursor control and input devices control the position of the cursor on the television screen. When the cursor is positioned within one of the input display windows, the cursor control and input devices are used to control the operation of the device driving that input window, through signals sent from the television to the appropriate device. Preferably, the devices are coupled to the television through an IEEE 1394 serial bus network.

33 Claims, 4 Drawing Sheets

U.S. PATENT DOCUMENTS

| | | | | |
|---|---|---|---|---|
| 5,450,140 | * | 9/1995 | Washino | 348/722 |
| 5,452,012 | | 9/1995 | Saitoh | 348/563 |
| 5,453,796 | * | 9/1995 | Duffield et al. | 348/565 |
| 5,499,018 | | 3/1996 | Welmer | 340/825.07 |
| 5,500,934 | | 3/1996 | Austin et al. | 395/755 |
| 5,502,504 | * | 3/1996 | Marshall et al. | 348/565 |
| 5,544,315 | * | 8/1996 | Lehfeldt et al. | 395/200.66 |
| 5,557,338 | * | 9/1996 | Maze et al. | 348/565 |
| 5,557,724 | | 9/1996 | Sampat et al. | 395/157 |
| 5,561,471 | * | 10/1996 | Kim | 348/565 |
| 5,657,246 | * | 8/1997 | Hogan et al. | 348/15 |
| 5,680,146 | | 10/1997 | Stirling | 345/1 |
| 5,682,489 | | 10/1997 | Harrow et al. | 395/349 |
| 5,699,052 | | 12/1997 | Miyahara | 340/825.25 |
| 5,731,844 | * | 3/1998 | Rauch et al. | 348/563 |
| 5,736,944 | | 4/1998 | Kurihara | 341/50 |
| 5,737,028 | * | 4/1998 | Bertram et al. | 348/563 |
| 5,740,801 | * | 4/1998 | Branson | 600/407 |
| 5,751,371 | * | 5/1998 | Shintani | 348/564 |
| 5,751,373 | * | 5/1998 | Ohyama et al. | 348/569 |
| 5,787,259 | * | 7/1998 | Haroun et al. | 395/200.83 |
| 5,790,201 | * | 8/1998 | Antos | 348/552 |
| 5,793,366 | * | 8/1998 | Mano et al. | 345/329 |
| 5,819,156 | * | 10/1998 | Belmont | 455/2 |
| 5,844,623 | * | 12/1998 | Iwamura | 348/553 |
| 5,847,771 | * | 12/1998 | Cloutier et al. | 348/564 |
| 5,850,340 | * | 12/1998 | York | 364/188 |
| 5,875,000 | * | 2/1999 | Yamaguchi | 348/563 |
| 5,913,030 | * | 6/1999 | Lotspiech et al. | 399/200.33 |
| 5,926,168 | * | 7/1999 | Fan | 345/158 |
| 5,926,207 | * | 7/1999 | Vaughan et al. | 348/13 |
| 5,999,167 | * | 12/1999 | Marsh et al. | 345/158 |

* cited by examiner

DISPLAY WITH ONE OR MORE DISPLAY WINDOWS AND PLACEMENT DEPENDENT CURSOR AND FUNCTION CONTROL

FIELD OF THE INVENTION

The present invention relates to the field of television and computer monitor display devices. More particularly, the present invention relates to the field of integrated television and computer display devices with cursor and function control.

BACKGROUND OF THE INVENTION

The IEEE 1394 standard, "P1394 Standard For A High Performance Serial Bus," Draft 8.0v2, Jul. 7, 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period.

An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394 standard is very thin in size compared to other bulkier cables used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394 cable environment is a network of nodes connected by point-to-point links, including a port on each node's physical connection and the cable between them. The physical topology for the cable environment of an IEEE 1394 serial bus is a non-cyclic network of multiple ports, with finite branches. The primary restriction on the cable environment is that nodes must be connected together without forming any closed loops.

The IEEE 1394 cables connect ports together on different nodes. Each port includes terminators, transceivers and simple logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394 serial bus. Using these components, the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

Existing televisions and personal computer (PC) monitors are very different. Televisions generally have a medium display resolution capability and several analog interfaces for receiving input signals, such as a composite video interface, an s-video interface and a radio frequency interface for radio frequency signals received over coaxial cable. Although, televisions are advancing in their ability to display increasingly higher resolutions of video and graphic data, consumer video resolution has changed little over time. While the picture tube of PC monitors is based on consumer television technology, PC monitors or displays have very different resolution requirements than consumer televisions, due to the need for PC monitors to have the ability to display legible small text and fine lines for detailed work. To meet this need, PC monitors have a higher resolution than consumer televisions and very different high bandwidth interfaces, such as Video Graphics Array (VGA), Super VGA (SVGA) and RGB.

Existing televisions with a picture-in-picture feature allow two video inputs to be viewed simultaneously on the television screen. For example, a viewer using the picture-in-picture feature is able to simultaneously view video signals from two different sources, e.g., from cable and from a video cassette recorder (VCR). However, control of the operation of each source of display is achieved through that source. Therefore, when controlling an external source such as a VCR, control signals from a remote control device must be directed towards that source.

What is needed is a display device that allows a user to display multiple display windows each driven by a device and control operation of the driving devices through the display. What is also needed is a single control interface to achieve these benefits.

SUMMARY OF THE INVENTION

A television with one or more display windows and placement dependent cursor and function control is configured to receive and simultaneously display video and graphics input from multiple devices, including but not limited to personal computers, video cassette recorders, settop boxes, video cameras and video disk players, as well as display video input signals from cable, antenna and satellite sources. The size of each display window is adjustable to encompass a predetermined amount of the display screen of the television. Multiple input windows driven by multiple devices can be viewed simultaneously. One or more cursor control and input devices are used to control the operation of the television and of the devices driving the display windows. The cursor control and input devices control the position of the cursor on the television screen. When the cursor is positioned within one of the input display windows, the cursor control and input devices are used to control the operation of the device driving that input window, through signals sent from the television to the appropriate device. Preferably, the devices are coupled to the television through an IEEE 1394 serial bus network.

DETAILED DESCRIPTION OF THE PREFERRED EMBODIMENT

A television with one or more display windows and placement dependent cursor and function control, is configured to receive and simultaneously display video and graphics inputs from multiple devices, including but not limited to personal computers, video cassette recorders, settop boxes video cameras and video disk players, as well as display video input signals from cable, antenna and satellite sources. Each display window is size adjustable to encompass a predetermined amount of the display screen of the television. Multiple input windows can be viewed simultaneously. The display windows can be layered or positioned adjacent to one another on the display screen.

Cursor control and input devices are used to control the operation of the television and of the devices driving the multiple input windows. Preferably, the cursor control and input devices are wireless, using infrared signals. Alternatively, as is well known in the art, the wireless cursor control and input devices can use any other appropriate communications technology. The wireless cursor control device controls the position of a cursor on the television display screen. When the cursor is positioned within one of the input windows, the cursor control device and other input devices are used to control the operation of the device driving that input window, through signals sent from the television to the appropriate device.

For example, if a PC is driving an input window which is being displayed on the television screen, when the cursor is positioned within the PC display window, the cursor control and other input devices are used to control the operation of and input data into the PC. The signals received from the cursor control and other input devices are received by the television. An input detection circuit within the television then determines within which display window the cursor is currently positioned and transmits those signals to the device driving that display window. Preferably, the devices are coupled to the television through an IEEE 1394 serial bus network.

Figure 1:
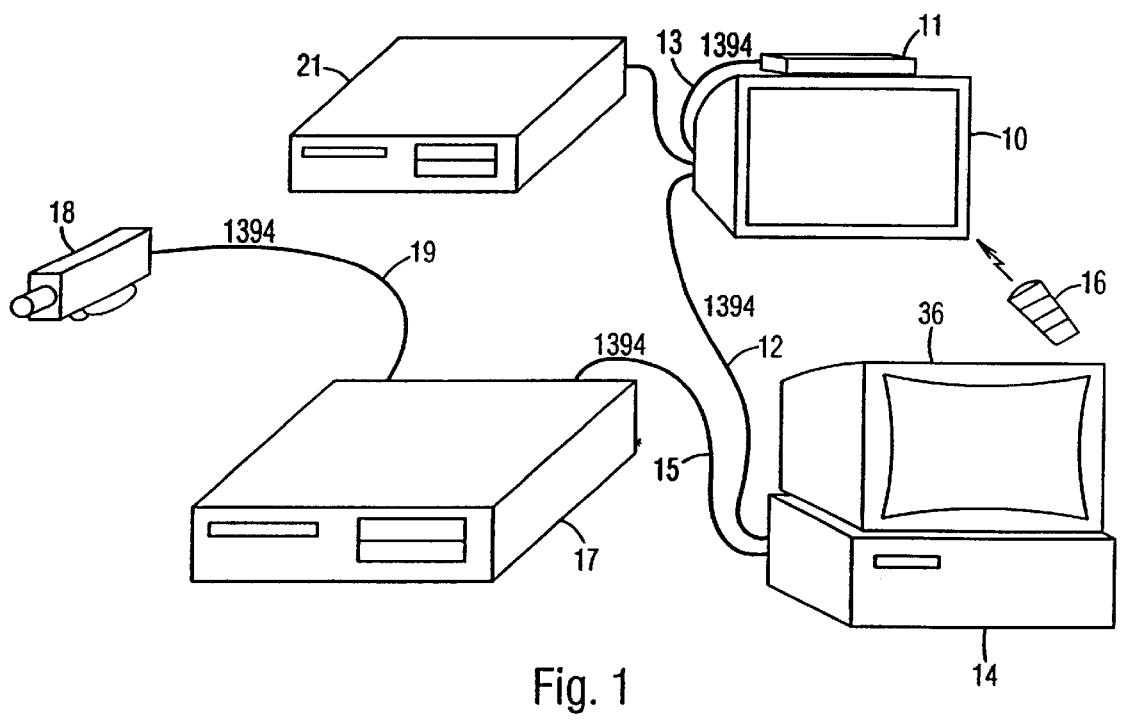
FIG. 1 illustrates a block diagram of an IEEE 1394 serial bus network including a personal computer and other devices coupled to a television of the present invention for driving display windows on the television.

A block diagram of an IEEE 1394 serial bus network including a PC, a video cassette recorder (VCR), a video camera and a television, is illustrated in FIG. 1. It should be understood that while a PC 14, a VCR and a video camera are used for illustration purposes, other devices can also be coupled to the television 10 for driving display windows. The PC 14 includes an associated display 36 and is coupled to the television 10, by an IEEE 1394 serial bus cable 12. A settop box 11 is coupled to the television 10 by an IEEE 1394 serial bus cable 13. A VCR 17 is coupled to the PC 14 by an IEEE 1394 serial bus cable 15. A video camera 18 is coupled to the VCR 17 by an IEEE 1394 serial bus cable 19. Together, the settop box 11, the television 10, the PC 14, the VCR 17 and the video camera 18 form an IEEE 1394 serial bus network. A second VCR 21 is coupled to the television through a traditional VCR interface circuit and is not part of the IEEE 1394 serial bus network.

A wireless cursor control/input device 16 provides input and control signals to the television. The wireless cursor control/input device 16 preferably includes infrared mouse technology for wirelessly controlling a current cursor position on the television. As discussed above, when positioned within a window on the television screen controlled by one of the remote driving devices, the cursor control/input device 16 is used to provide signals to the driving device which is driving the display window. Such signals are provided to the remote driving device through the television 10 and the IEEE 1394 serial bus. Preferably, the cursor control/input device 16 communicates with the television 10 using infrared signals. Alternatively, any other suitable cursor control/input device can be substituted for the device 16, including but not limited to a wired input device, a radio frequency input device and a wired or wireless keyboard with integral cursor control device. The settop box 11, PC 14, VCR 17 and video camera 18 are all referred to as remote driving devices because they are not included or resident within the television 10.

Figure 2:
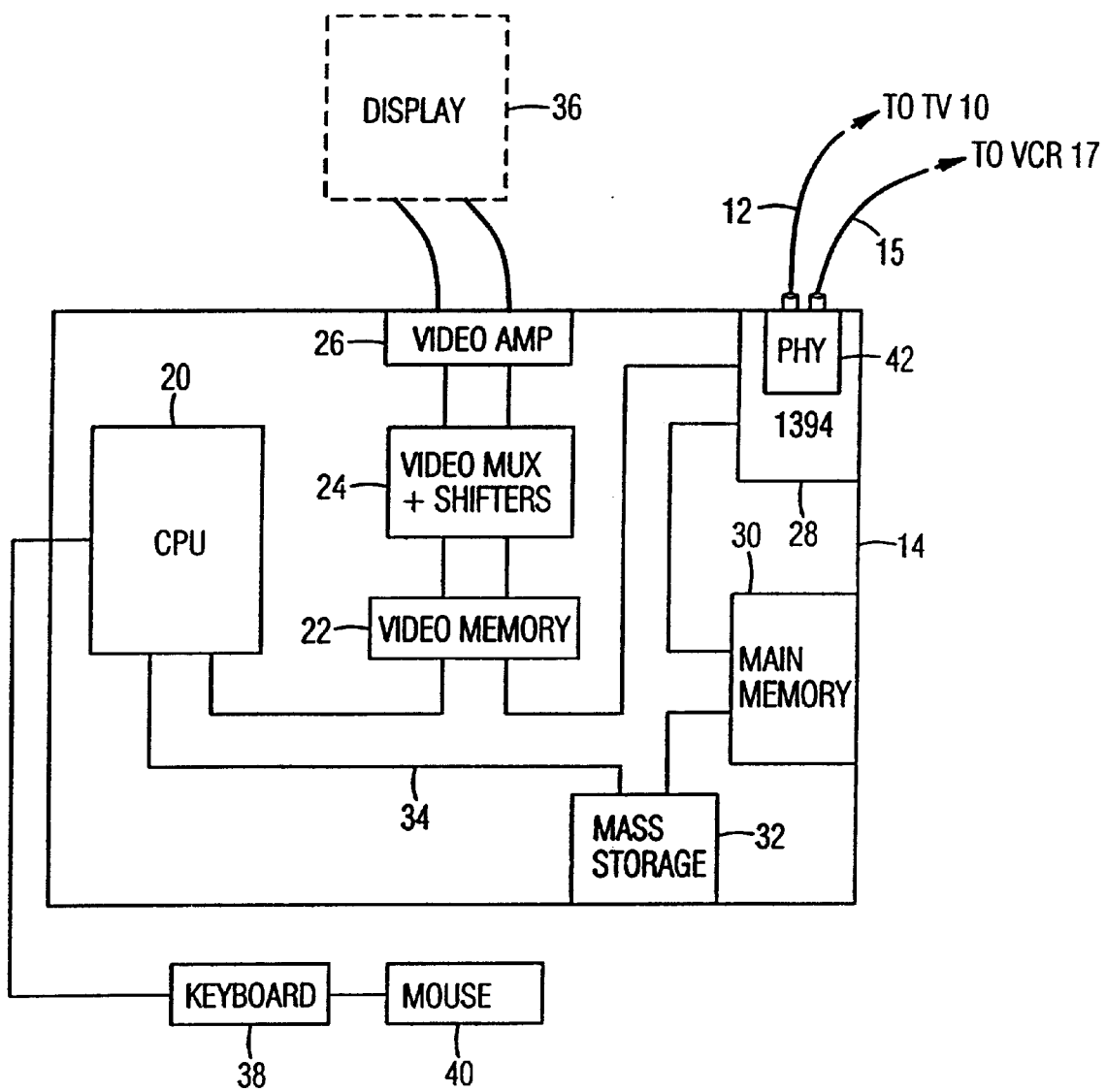
FIG. 2 illustrates a block diagram of the internal components of the personal computer of FIG. 1.

A block diagram of the internal components of the PC 14 is illustrated in FIG. 2. While any appropriate input device can be used to drive a display window on the television 10, an exemplary computer system 14 is illustrated in FIG. 2. The PC system 14 includes a central processor unit (CPU) 20, a main memory 30, a video memory 22, a mass storage device 32 and an IEEE 1394 interface circuit 28, all coupled together by a conventional bidirectional system bus 34. The interface circuit 28 includes the physical interface circuit 42 for sending and receiving communications on the IEEE 1394 serial bus. The physical interface circuit 42 is coupled to the television 10 and to the VCR 17, over the IEEE 1394 serial bus cables 12 and 15, respectively. In the preferred embodiment of the present invention, the interface circuit 28 is implemented on an IEEE interface card within the PC 14. However, it should be apparent to those skilled in the art that the interface circuit 28 can be implemented within the PC 14 in any other appropriate manner, including building the interface circuit onto the motherboard itself. The mass storage device 32 may include both fixed and removable media using any one or more of magnetic, optical or magneto-optical storage technology or any other available mass storage technology. The system bus 34 contains an address bus for addressing any portion of the memory 22 and 30. The system bus 34 also includes a data bus for transferring data between and among the CPU 20, the main memory 30, the video memory 22, the mass storage device 32 and the interface circuit 28.

The PC system 14 is also coupled to a number of peripheral input and output devices including the keyboard 38, the mouse 40 and possibly the associated display 36. The keyboard 38 is coupled to the CPU 20 for allowing a user to input data and control commands into the computer system 14. A conventional mouse 40 is coupled to the keyboard 38 for manipulating graphic images on the display 36 as a cursor control device. As will be discussed in detail below, when the PC system 14 is coupled to the television and driving a display window, cursor control and input devices for use with the television 10 can be used in conjunction with or to replace the keyboard 38 and mouse 40. Furthermore, the associated display 36 of the PC system 14 can either be used in tandem or replaced by the display window on the screen of the television 10, driven by the PC 14. For example, when the PC 14 is driving a display window on the television 10, the associated display 36 of the PC system 14 may not be necessary.

A port of the video memory 22 is coupled to a video multiplex and shifter circuit 24, which in turn is coupled to a video amplifier 26. The video amplifier 26 drives the display 36, when it is being used. The video multiplex and shifter circuitry 24 and the video amplifier 26 convert pixel data stored in the video memory 22 to raster signals suitable for use by the display 36.

Figure 3:
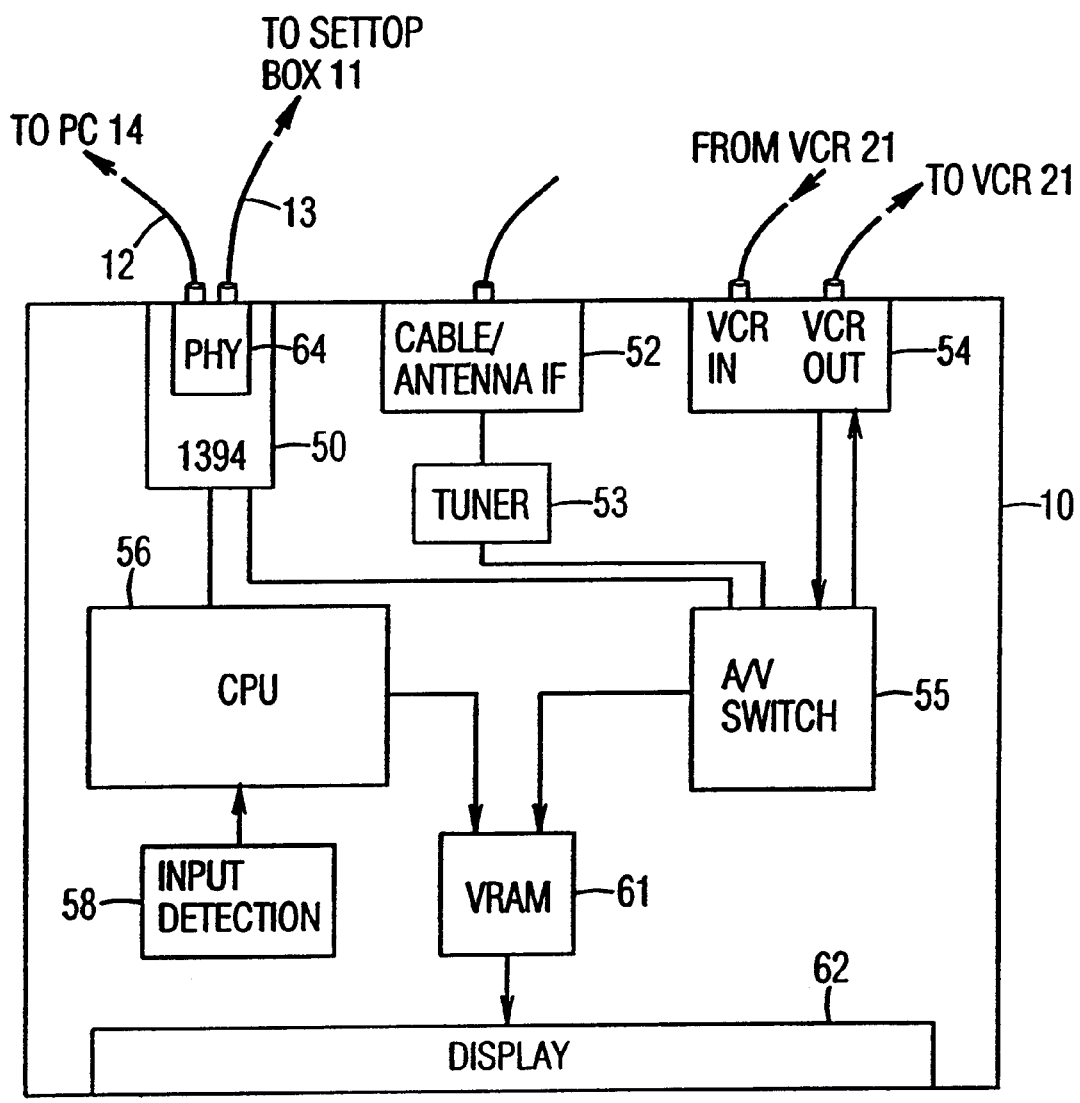
FIG. 3 illustrates a block diagram of the relevant internal components of the television of the present invention.

A block diagram of the relevant internal components of the television 10 is illustrated in FIG. 3. An IEEE 1394 interface circuit 50 includes a physical interface circuit 64. The physical interface circuit 64 is coupled to the PC 14 and to the settop box 11, over the IEEE 1394 serial bus cables 12 and 13, respectively. The IEEE 1394 interface circuit 50 is coupled to a CPU 56 for controlling communications between the CPU 56 and devices coupled to the IEEE 1394 serial bus network. The IEEE 1394 interface circuit 50 is also coupled to an audio/video switch 55 for providing video signals from the devices coupled to the IEEE 1394 serial bus network. A cable/antenna interface circuit 52 is coupled to receive input signals from a coaxial cable or an antenna and to pass those signals through a tuner 53 to an audio/video switch 55. A traditional VCR interface circuit 54 is coupled to receive input signals from the VCR 21 and to output signals to the VCR 21. The VCR interface circuit 54 is also coupled to the audio/video switch 55 for directing audio/video signals to and from the VCR 21. As illustrated in FIG. 1, a properly configured VCR 17, capable of communication over the IEEE 1394 serial bus, is also coupled to the television 10 through the IEEE 1394 serial bus network.

An input detection circuit 58 is coupled to the CPU 56 for detecting input signals from the cursor control device 16 and other input devices. Based on signals from the input detection circuit 58 the CPU 56 determines the current placement of the cursor and sends the control signals to the appropriate driving device over the IEEE 1394 serial bus. The audio/video switch 55 and the CPU 56 are coupled to the video random access memory (VRAM) circuit 61 for combining windows which are controlled by the PC 14 or other driving devices, with windows featuring live video driven by the television 10 using signals received either from the VCR 21 through the VCR interface circuit 54, the cable/antenna interface circuit 52 or other devices coupled to the television 10 through the IEEE 1394 serial bus. The VRAM circuit 61 provides the video signals to the display 62. If a compressed video stream of data is received by the television 10, that stream of data is decompressed before being sent to the VRAM circuit 61 by a coder/decoder circuit (CODEC) or other appropriate decompression engine, within the television 10.

Figure 4:
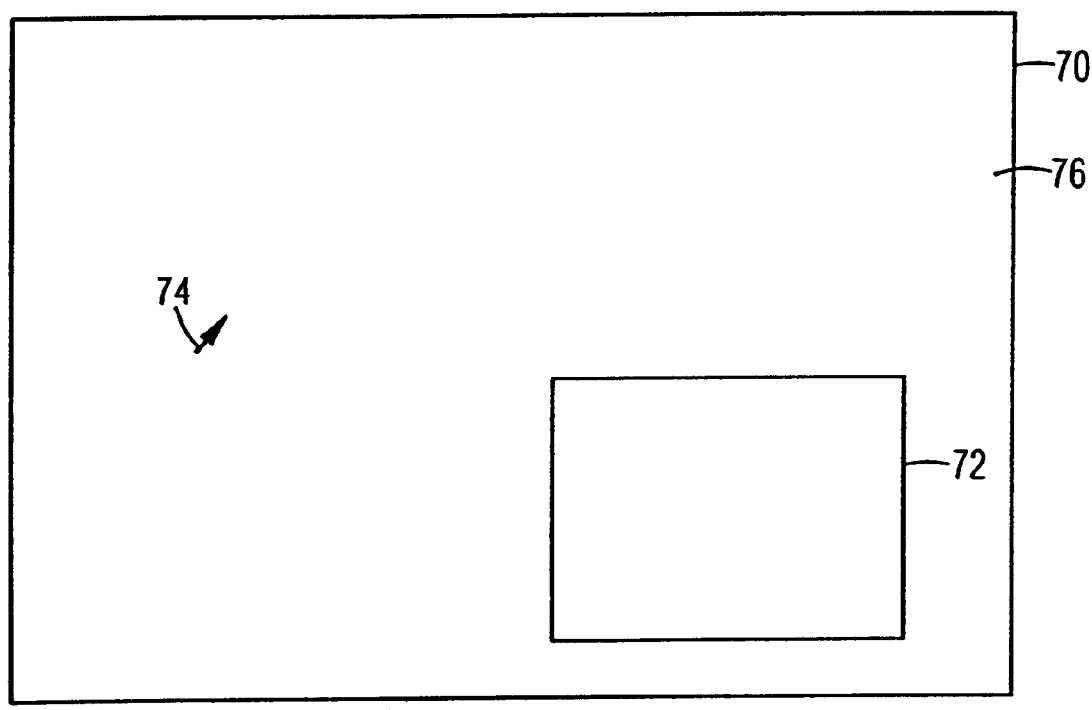
FIG. 4 illustrates an example of a television screen, including a main display window and a secondary display window.

An example of a screen 70, including a main display window 76 and a secondary display window 72, is illustrated in FIG. 4. In this example, the main display window 76 is driven by the television 10 itself, from a signal received through the cable interface circuit 52, and the secondary display window 72 is driven by the PC 14. The IEEE 1394 interface circuit 50 provides a two-way communication channel between the television 10 and a device driving a display window, in this case the PC 14. Signals from the PC 14, necessary for driving the display window 72 are sent through the IEEE 1394 interface circuit 50 to the VRAM circuit 61, as controlled by the CPU 56. The VRAM circuit 61 then uses those signals to provide the output video, graphics or text within the display window 72 on the screen 70. Control and input signals received by the input detection circuit 58 are used to control the television 10 if the cursor 74 is currently positioned in the main display window 76, which is driven by the television 10. If the cursor 74 is currently positioned within the secondary display window 72, then control and input signals received by the input detection circuit 58 are transmitted through the IEEE 1394 interface circuit 50 to the device driving the secondary display window, in this example, the PC 14.

Each device which is driving a display window on the television 10 must preferably establish a separate connection, through the IEEE 1394 serial bus network, with the television 10. As stated above, this connection is bidirectional; e.g. once a connection is established the television 10 and the PC 14 send signals to each other. Once a connection is established with the television 10, a device driving a display window establishes that window by first requesting that the display window be established by the television. When making this request, the driving device specifies characteristics of the display window including x position on the screen, y position on the screen, width, height, color depth and color space. If these characteristics are not specified by the driving device when the request is made, then the television 10 will establish the display window using default parameters.

After receiving a request to establish a display window from a driving device, the television 10 then sends an acknowledging response back to the driving device indicating whether the request was successful or not. If the connection request was successful and the television 10 is able to create a display window, then the acknowledging response contains a handle to the display window, information regarding the characteristics of the display window including the x position, y position, width, height, color depth and color space of the window and an IEEE 1394 offset address to the television display space where the window begins. If the connection was not successful, the response to the driving device includes information regarding the reasons for the failed connection. For example, if the PC 14 specified a width for the display window which cannot be accommodated by the television 10, then the information within the response includes the width of a display window that could be accommodated by the television 10. In this case, the PC 14 is then able to adjust its parameters to fit within the available parameters.

If a driving device desires to change a display window which has previously been established, then the driving device sends a change request to the television with the data containing the parameters to be changed. In response to this change request, the television 10 will send an acknowledging response back to the driving device indicating whether or not the display window parameters were successfully changed. If the window parameters were successfully changed, the data contains the new values and the new IEEE 1394 offset address of the display window. If the window parameters were not successfully changed, the data within the response indicates the reason why the request failed.

A driving device can also change the shape of the pointer or cursor used within the display window on the television 10 which it is controlling, by sending a change cursor request to the television 10. This request will include data regarding the window it wants to change the cursor for. In response to a change cursor request, the television 10 sends a response back to the driving device indicating whether the request failed or succeeded. This response indicates the x and y positions of the cursor within the window, the width and height of the cursor, the x and y positions of the hot spot of the cursor and the IEEE 1394 offset address where the cursor begins. The driving device then writes the new cursor into that specified IEEE 1394 offset address.

When a bus reset occurs on the IEEE 1394 serial bus, the television 10 waits for a predetermined period of time before reclaiming its own display area. During this time period, a driving device which was previously controlling a display window can reestablish the connection with the television 10. If the driving device does not reestablish the connection during this time period, the television 10 closes the driving device's window and disconnects from the driving device. To reestablish the connection, a driving device sends the television 10 a unique connection identification number or window handle, which tells the television 10 that the driving device is reestablishing a previous connection. Assuming that the driving device saved the position of that window along with its identification number, the display window will be maintained at the same position as it was before. After receiving a request to reestablish a previous connection, the television 10 will send back a response to the driving device indicating whether or not the connection has been successfully reestablished.

When a driving device desires to close a connection with the television and thereby close a display window which it is controlling, a disconnect request is sent to the television 10. This disconnect request includes the connection identification number. After receiving a disconnect request, the television 10 sends a disconnect acknowledging response indicating whether or not the disconnect is successful. If the disconnect is not successful, then the driving device repeats the disconnect request until the connection is successfully terminated and the display window is closed.

Once a connection is established between the television 10 and a driving device and a display window is open and being driven by input signals from the driving device, input signals can be sent from the cursor control/input device 16 to the driving device through the television 10. When the input detection circuit 58 detects an input signal and the cursor is positioned within the display window. then the input signal is sent through the IEEE 1394 interface circuit 50 to the driving device over the IEEE 1394 serial bus. Accordingly, a driving device can be controlled by a user even when the driving device is not in the same location as the television 10 of the present invention. The television 10 and input device 16 of the present invention can therefore be used to control devices throughout a home, school, office or other appropriate environment, which are coupled to the television 10 by an IEEE 1394 serial bus. This control is accomplished by positioning the cursor within a display window on the television 10 driven by an appropriate device and entering control input signals which will be transmitted to the device through the television 10.

The television 10 according to the present invention, with multiple display windows and placement dependent cursor and function control, will display video and graphics inputs from multiple driving devices within appropriate display windows. The size of each display window is adjustable to encompass a predetermined amount of the display screen. A cursor control and input device is used to control the operation of the television 10 and of the devices driving display windows. When the cursor is positioned within a display window, the cursor control and input device is used to control the operation of and provide input to the device driving that display window, through signals sent from the television to the appropriate device over the IEEE 1394 serial bus.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of displaying input signals on a display device having a first driving device comprising the steps of:
    a. establishing a connection between the display device and a second driving device;
    b. opening a display window on the display device driven by the second driving device;
    c. determining a current cursor position on the display device; and
    d. receiving input signals through the display device, transmitting the input signals to the second driving device when the current cursor position is within the display window and transmitting the input signals to the first driving device when the current cursor position is outside the display window yet within the display device.

2. The method as claimed in claim 1 wherein the first driving device is a local driving device resident within the display device and the second driving device is a remote device not resident within the display device.

3. The method as claimed in claim 2 wherein the remote driving device is a personal computer.

4. The method as claimed in claim 3 wherein the connection between the display device and a second driving device is established through an IEEE 1394 serial bus.

5. The method as claimed in claim 2 wherein the remote driving device is a consumer electronics device.

6. The method as claimed in claim 5 wherein the connection between the display device and a second driving device is established through an IEEE 1394 serial bus.

7. The method as claimed in claim 1 further comprising the step of controlling the cursor position on the display device based on input signals.

8. The method as claimed in claim 7 wherein the input signals are received from a wireless mouse device.

9. The method as claimed in claim 7 wherein the input signals are received from a keyboard device.

10. The method as claimed in claim 8 wherein the connection between the display device and the second driving device is established through an IEEE 1394 serial bus.

11. The method as claimed in claim 10 wherein the display device is a television.

12. A method of displaying input signals on a display device having a local driving device comprising the steps of:
    a. establishing a connection between the display device and one or more remote driving devices;
    b. opening one or more display windows on the display device driven by a corresponding one of the one or more remote driving devices;

c. determining a current cursor position on the display device; and d. receiving input signals through the display device and transmitting the input signals to the corresponding one of the one or more remote driving devices when the current cursor position is within the corresponding display window.

13. The method as claimed in claim 12 further comprising the step of controlling the cursor position on the display device based on input signals.

14. The method as claimed in claim 12 wherein the connection between the display device and the one or more remote driving devices is established through an IEEE 1394 serial bus.

15. The method as claimed in claim 13 wherein the input signals are received from a wireless mouse device.

16. The method as claimed in claim 14 wherein the input signals are received from a keyboard device.

17. The method as claimed in claim 14 wherein the remote driving device is a personal computer.

18. The method as claimed in claim 17 wherein the display device is a television.

19. A display system having a local driving device for displaying signals comprising:

a. a display device including an input detection device for determining a current cursor position on the display device;

b. one or more remote driving devices coupled to the display device for establishing a connection between the display device and the remote driving devices, wherein a display window is opened on the display device for each successful connection; and c. an input device for providing control signals and input to the display device, wherein the control signals and input are transmitted from the display device to an appropriate one of the remote driving devices when the current cursor position is within the display window of the remote driving device.

20. The display system as claimed in claim 19 wherein the input device is a wireless mouse device.

21. The display system as claimed in claim 20 wherein the input device is used to control the current cursor position.

22. The display system as claimed in claim 21 wherein the one or more remote driving devices are coupled to the display device by an IEEE 1394 serial bus.

23. The display system as claimed in claim 22 wherein the display device is a television.

24. The display system as claimed in claim 23 wherein the local driving device is resident within the display system and the remote driving device is not resident within the display device.

25. A display device for displaying signals from one or more driving devices comprising:

a. an interface circuit configured for coupling to one or more driving devices, thereby establishing a connection between the display device and the driving devices, wherein a display window is opened on the display device for each successful connection;

b. an input detection circuit for determining a current cursor position on the display device; and c. an input device for providing control signals and input to the display device, wherein the control signals and input are transmitted from the display device to an appropriate one of the driving devices when the current cursor position is within the display window of the driving device.

26. The display device as claimed in claim 25 wherein the input device is used to control the current cursor position.

27. The display device as claimed in claim 26 wherein the input device is a wireless mouse device.

28. The display device as claimed in claim 26 wherein the input device is a keyboard device.

29. The display device as claimed in claim 27 wherein the interface circuit is an IEEE 1394 serial bus interface circuit and includes an IEEE 1394 physical connection.

30. A display system for displaying video and graphics signals comprising:

a. a television including an input detection device for determining a current cursor position on the television;

b. a personal computer driving device coupled to the television by an IEEE 1394 serial bus for establishing a connection between the television and the personal computer, wherein a display window is opened on the television for the personal computer; and c. an input device for providing control signals and input to the television, wherein the control signals and input are transmitted from the television to the personal computer when the current cursor position is within the display window controlled by the personal computer and the control signals and input are transmitted directly to the television when the current cursor position is outside the display window yet within the television.

31. The display system as claimed in claim 30 wherein the input device is a wireless mouse device.

32. The display system as claimed in claim 30 wherein the input device is a keyboard device.

33. The display system as claimed in claim 31 wherein the input device is used to control the current cursor position.

* * * * *